United States Patent
Kaiser et al.

(10) Patent No.: US 11,289,118 B1
(45) Date of Patent: Mar. 29, 2022

(54) SPINTRONIC DEVICE HAVING NEGATIVE INTERFACE SPIN SCATTERING

(71) Applicant: Western Digital Technologies, Inc., San Jose, CA (US)

(72) Inventors: Christian Kaiser, San Jose, CA (US); Andrew Chen, San Jose, CA (US); Zheng Gao, San Jose, CA (US); Susumu Okamura, Fujisawa (JP); James Mac Freitag, Sunnyvale, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/184,543

(22) Filed: Feb. 24, 2021

Related U.S. Application Data

(60) Provisional application No. 63/133,695, filed on Jan. 4, 2021.

(51) Int. Cl.
  *G11B 5/23* (2006.01)
  *G11B 5/31* (2006.01)
  (Continued)

(52) U.S. Cl.
  CPC .......... *G11B 5/3909* (2013.01); *G11B 5/1278* (2013.01); *G11B 5/23* (2013.01);
  (Continued)

(58) Field of Classification Search
  None
  See application file for complete search history.

(56) References Cited

U.S. PATENT DOCUMENTS

| | | | |
|---|---|---|---|
| 8,274,811 B2 | 9/2012 | Zhang et al. | |
| 8,614,861 B1 * | 12/2013 | Tomoda | G11B 5/127 360/125.3 |

(Continued)

FOREIGN PATENT DOCUMENTS

| | | |
|---|---|---|
| JP | 2016119132 A | 6/2016 |
| WO | 2016076799 A1 | 5/2016 |

OTHER PUBLICATIONS

Tagawa, Ikuya, "Effect of Transmitted Spin from Head Poles in MAMR", Journal of the Magnetics Society of Japan, vol. 44, No. 1, 2020, pp. 5-8.

(Continued)

*Primary Examiner* — Jefferson A Evans
(74) *Attorney, Agent, or Firm* — Patterson & Sheridan, LLP; Steven H. Versteeg

(57) ABSTRACT

Aspects of the present disclosure generally relate to a magnetic recording head of a magnetic media drive. In one example, a magnetic recording head includes a main pole, a trailing shield, and spintronic device disposed between the main pole and the trailing shield. The spintronic device comprises a negative polarization layer (NPL) disposed on the main pole, the NPL comprising FeTi, FeV, FeCr, or FeN, an interface layer disposed on the NPL, the interface layer comprising V, Cr, or Ru, a spacer layer disposed on the interface layer, and a spin torque layer (FGL) disposed on the spacer layer. When current is applied to the spintronic device, the NPL and a first interface disposed between the NPL and the interface layer have a negative spin polarization while the FGL and a second interface disposed between the FGL and the spacer layer have a positive spin polarization.

20 Claims, 8 Drawing Sheets

(51) Int. Cl.
*G11B 5/39* (2006.01)
*G11B 5/127* (2006.01)

(52) U.S. Cl.
CPC ............ *G11B 5/313* (2013.01); *G11B 5/3133* (2013.01); *G11B 5/3146* (2013.01); *G11B 5/3153* (2013.01); *G11B 5/3912* (2013.01)

(56) References Cited

U.S. PATENT DOCUMENTS

| | | | |
|---|---|---|---|
| 8,953,283 | B2 | 2/2015 | Shimizu et al. |
| 9,099,107 | B1 | 8/2015 | Igarashi et al. |
| 9,218,828 | B1 | 12/2015 | Koui et al. |
| 9,406,315 | B2 | 8/2016 | Shiimoto et al. |
| 10,109,302 | B1* | 10/2018 | Shinohara ............... G11B 5/315 |
| 10,522,174 | B1 | 12/2019 | Chen et al. |
| 10,937,450 | B1* | 3/2021 | Kawasaki ................. G11B 5/02 |
| 2009/0310244 | A1* | 12/2009 | Shimazawa ............ G11B 5/314 360/75 |
| 2010/0027161 | A1* | 2/2010 | Takagishi ............... G11B 5/314 360/110 |
| 2011/0216436 | A1* | 9/2011 | Igarashi .................. H01L 43/08 360/61 |
| 2015/0124347 | A1* | 5/2015 | Shimoto ................ G11B 5/314 360/71 |
| 2015/0162031 | A1 | 6/2015 | Shimizu et al. |
| 2015/0228295 | A1* | 8/2015 | Shiimoto ............. G11B 5/1278 360/125.31 |
| 2016/0086623 | A1* | 3/2016 | Nagasaka ............ G11B 5/3146 360/125.3 |
| 2017/0309301 | A1 | 10/2017 | Takahashi et al. |
| 2019/0295572 | A1 | 9/2019 | Olson et al. |
| 2020/0312354 | A1* | 10/2020 | Wu ....................... G11B 5/3929 |

OTHER PUBLICATIONS

Watanabe, Katsuro et al., "Oscillation Stability of a Small Size Spin Torque Oscillator for Mamr", IEEE Transactions an Magnetics, vol. 49, No. 7, Jul. 2013, pp. 3628-3631.

International Search Report and the Written Opinion for International Application No. PCT/US2021/034549 dated Nov. 1, 2021, 10 pages.

* cited by examiner

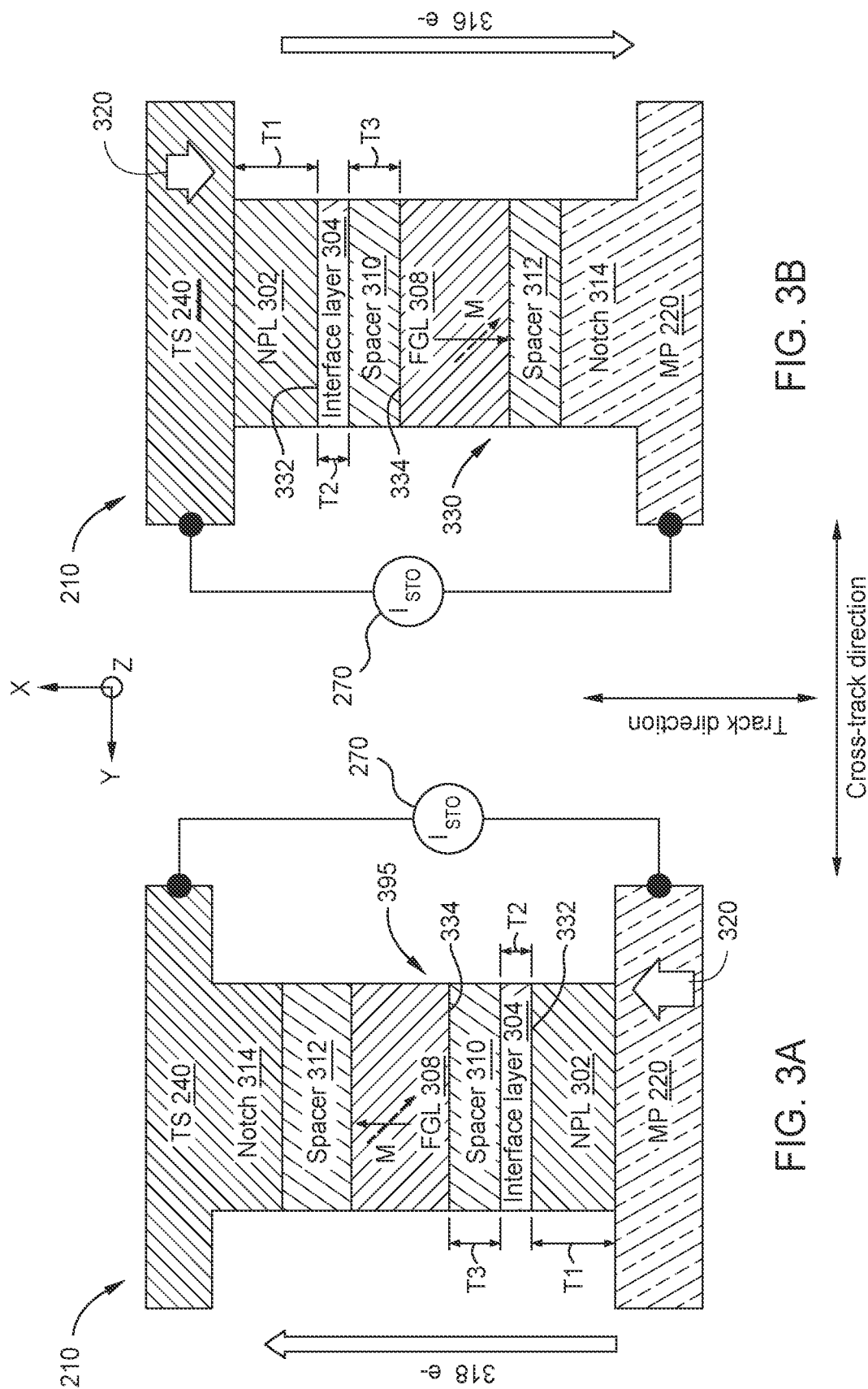

SPINTRONIC DEVICE HAVING NEGATIVE INTERFACE SPIN SCATTERING

CROSS-REFERENCE TO RELATED APPLICATIONS

This application claims benefit of U.S. provisional patent application Ser. No. 63/133,695, filed Jan. 4, 2021, which is herein incorporated by reference.

BACKGROUND OF THE DISCLOSURE

Field of the Disclosure

Aspects of the present disclosure generally relate to a magnetic recording head of a spintronic device, such as a write head of a data storage device, for example a magnetic media drive.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at a media facing surface (MFS). As the main pole becomes smaller, the writing field becomes smaller as well, limiting the effectiveness of the magnetic write head.

Heat-assisted magnetic recording (HAMR) and microwave-assisted magnetic recording (MAMR) are two types of energy-assisted recording technology to improve the recording density of a magnetic recording medium, such as a HDD. In MAMR, a spin torque oscillator (STO) device is located next to or near the write element in order to produce a high-frequency AC field, such as in a microwave frequency band. The high-frequency AC field reduces an effective coercivity of a magnetic recording medium used to store data and allows writing of the magnetic recording medium at lower magnetic writing fields emanated from the write pole. Thus, higher recording density of the magnetic recording medium may be achieved by MAMR technology.

Energy-assisted recording write heads may require an undesirable high voltage and/or an undesirable high current to produce a write field enhancement. A high voltage and/or high current may impact the lifetime and the reliability of the write head by degrading components of the write head. Lowering the voltage or the current, moment-thickness product of the energy-assist magnetic layer, can hinder writer performance, lower areal density capability (ADC), and/or limit the materials used in write heads.

Therefore, there is a need for write heads that simply and effectively facilitate write head performance reliability and high moment-thickness product of the energy-assist magnetic layer while facilitating lower voltage or current to facilitate effective and efficient magnetic recording, and high ADC of magnetic recording.

SUMMARY OF THE DISCLOSURE

Aspects of the present disclosure generally relate to a magnetic recording head of a magnetic media drive. In one example, a magnetic recording head includes a main pole, a trailing shield, and spintronic device disposed between the main pole and the trailing shield. The spintronic device comprises a negative polarization layer (NPL) disposed on the main pole, the NPL comprising FeTi, FeV, FeCr, or FeN, an interface layer disposed on the NPL, the interface layer comprising V, Cr, or Ru, a spacer layer disposed on the interface layer, and a field generating layer (FGL) disposed on the spacer layer. When current is applied to the spintronic device, the NPL and a first interface disposed between the NPL and the interface layer have a negative spin polarization while the FGL and a second interface disposed between the FGL and the spacer layer have a positive spin polarization.

In one embodiment, a magnetic recording head comprises a main pole, a trailing shield, and a spintronic device disposed between the main pole and the trailing shield. The spintronic device comprises a negative polarization layer disposed on the main pole, the negative polarization layer comprising Fe and one of Ti, V, Cr, or N, an interface layer disposed on the negative polarization layer, the interface layer comprising V, Cr, or Ru, a first spacer layer disposed on the interface layer, and a field generating layer disposed on the first spacer layer.

In another embodiment, a magnetic recording head comprises a main pole, a trailing shield, and a spintronic device disposed between the main pole and the trailing shield. The spintronic device comprises a negative polarization layer disposed on the trailing shield, the negative polarization layer comprising Fe and at least one of Ti, V, Cr, or N, an interface layer disposed on the negative polarization layer, the interface layer comprising Cr, V, or Ru, a first interface defined between the negative polarization layer and the interface layer, a first spacer layer disposed on the interface layer, a field generating layer disposed on the first spacer layer, and a second interface defined between the first spacer layer and the field generating layer. The magnetic recording head further comprises a current source configured to apply a current through the spintronic device.

In another embodiment, a magnetic recording head comprises a main pole, a trailing shield, and a spintronic device disposed between the main pole and the trailing shield. The spintronic device comprises a negative polarization layer disposed on the main pole, the negative polarization layer comprising Fe and at least one of Ti, V, Cr, or N, an interface layer disposed on the negative polarization layer, the interface layer comprising Cr, V, or Ru, a first interface defined between the negative polarization layer and the interface layer, a first spacer layer disposed on the interface layer, a field generating layer disposed on the first spacer layer, and a second interface defined between the first spacer layer and the field generating layer. The magnetic recording head further comprises means for applying a current through the spintronic device, wherein the negative polarization layer and the first interface have a negative spin polarization and the field generating layer and the second interface have a positive spin polarization when current is applied.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3B are schematic illustrations of a MFS of the write head shown in FIG. 2, according to various implementations.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to a magnetic recording head of a magnetic media drive. In one example, a magnetic recording head includes a main pole, a trailing shield, and spintronic device disposed between the main pole and the trailing shield. The spintronic device comprises a negative polarization layer (NPL) disposed on the main pole, the NPL comprising FeTi, FeV, FeCr, or FeN, an interface layer disposed on the NPL, the interface layer comprising V, Cr, or Ru, a spacer layer disposed on the interface layer, and a field generating layer (FGL) disposed on the spacer layer. When current is applied to the spintronic device, the NPL and a first interface disposed between the NPL and the interface layer have a negative spin polarization while the FGL and a second interface disposed between the FGL and the spacer layer have a positive spin polarization.

Figure 1:
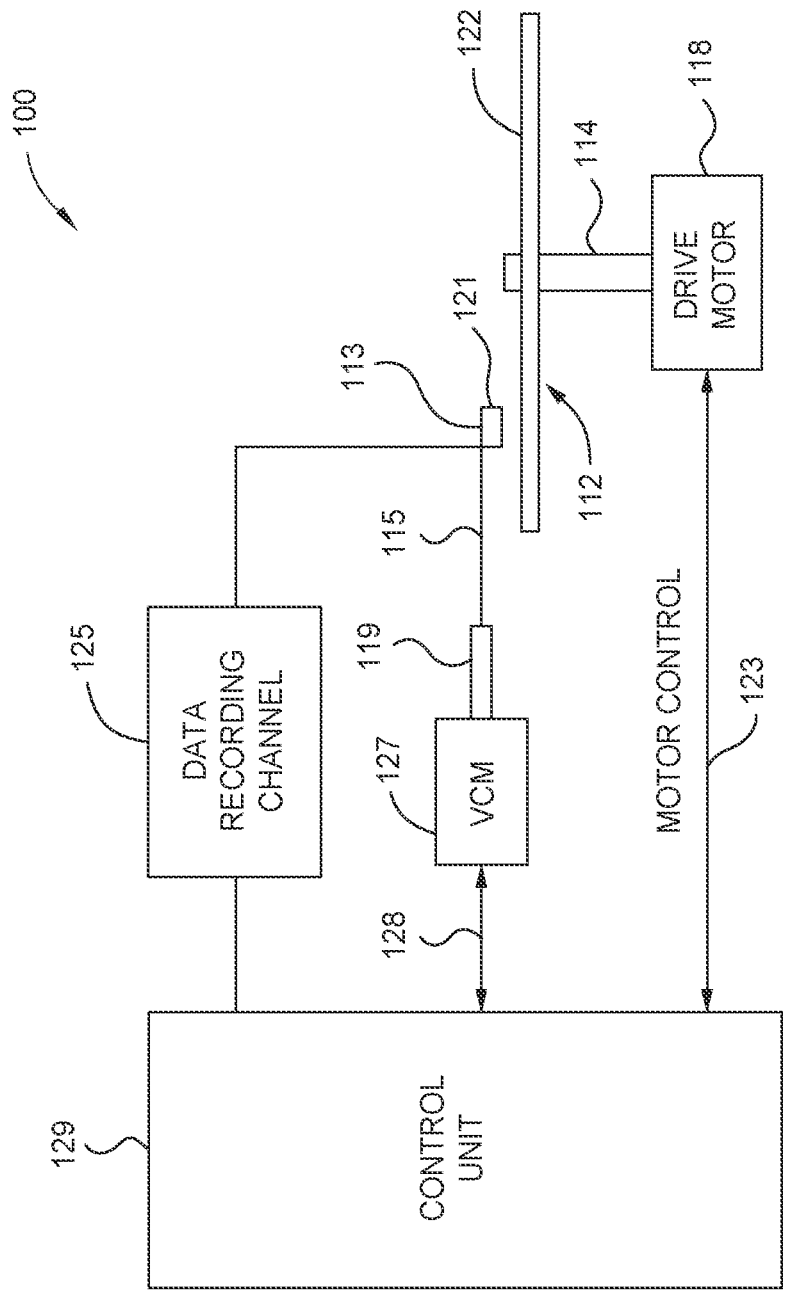
FIG. 1 is a schematic illustration of a magnetic recording device, according to one implementation.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
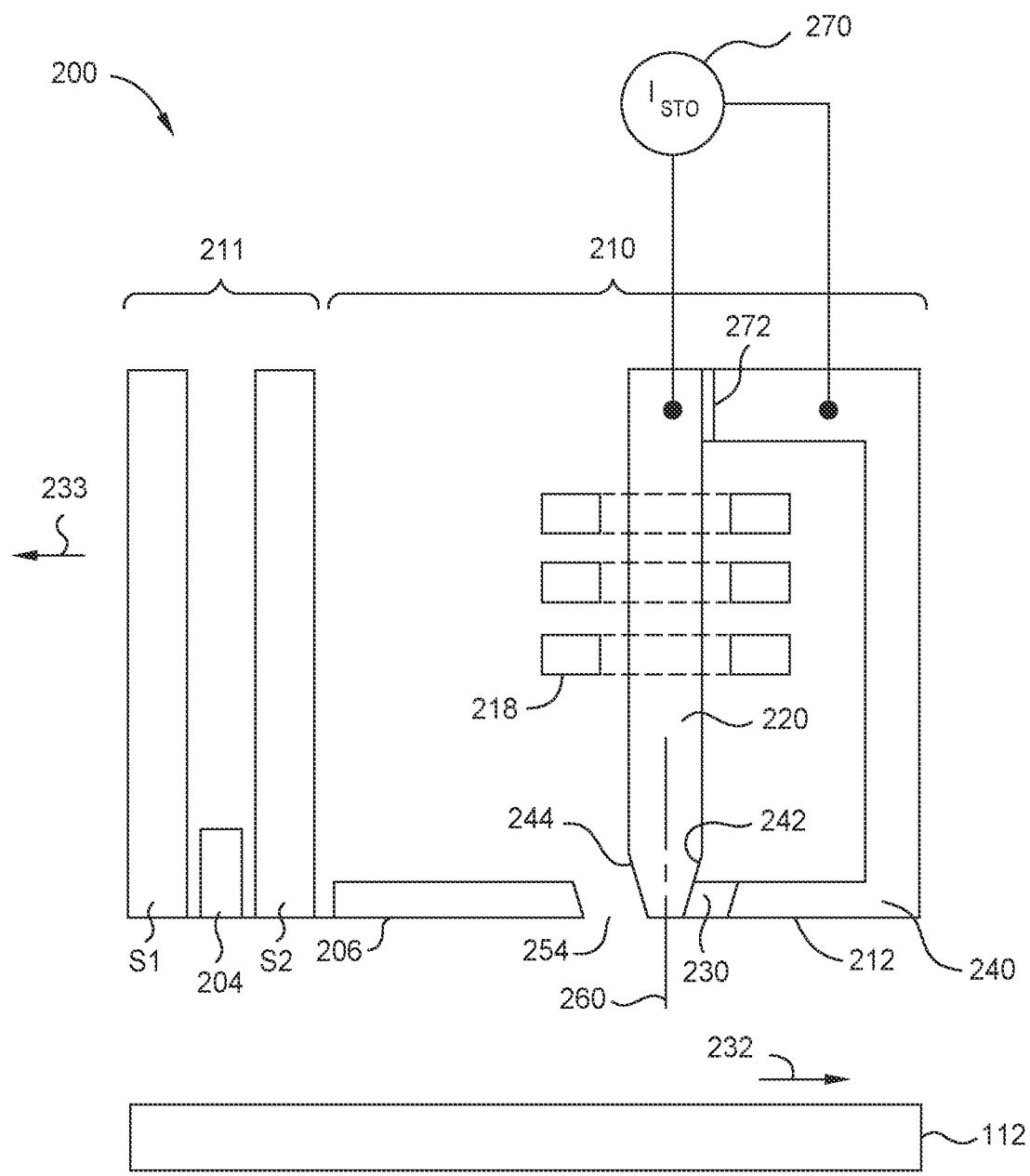
FIG. 2 is a schematic illustration of a cross sectional side view of a head assembly facing the magnetic disk shown in FIG. 1 or other magnetic storage medium, according to one implementation.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 233.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magnetoresistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and a spintronic device 230 disposed between the main pole 220 and the TS 240. The main pole 220 serves as a first electrode. Each of the main pole 220, the spintronic device 230, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In some embodiments, the spintronic device 230 is positioned proximate the main pole 220 and reduces the coercive force of the magnetic recording medium, so that smaller writing fields can be used to record data. In such embodiments, an electron current is applied to spintronic device 230 from a current source 270 to produce a microwave field. The electron current may include direct current (DC) waveforms, pulsed DC waveforms, and/or pulsed current waveforms going to positive and negative voltages, or other suitable waveforms. In other embodiments, an electron current is applied to spintronic device 230 from a current source 270 to produce a high frequency alternating current (AC) field to the media.

In one embodiment, which can be combined with other embodiments, the spintronic device 230 is electrically coupled to the main pole 220 and the TS 240. The main pole 220 and the TS 240 are separated in an area by an insulating layer 272. The current source 270 may provide electron current to the spintronic device 230 through the main pole 220 and the TS 240. For direct current or pulsed current, the current source 270 may flow electron current from the main pole 220 through the spintronic device 230 to the TS 240 or may flow electron current from the TS 240 through the spintronic device 230 to the main pole 220 depending on the orientation of the spintronic device 230. In one embodiment, which can be combined with other embodiments, the spintronic device 230 is coupled to electrical leads providing an electron current other than from the main pole 220 and/or the TS 240.

FIGS. 3A-3B are schematic illustrations of a MFS view of the write head 210 shown in FIG. 2, according to various embodiments. The write head 210 of FIG. 3A includes a spintronic device 395 between the main pole 220 and the TS 240 in the track direction. The spintronic device 395 may be used as the spintronic device 230 shown in FIG. 2. The write head 210 of FIG. 3B includes a reverse structure spintronic device 330 between the main pole 220 and the TS 240 in the track direction. The spintronic device 330 may be used as the spintronic device 230 shown in FIG. 2. The spintronic devices 330, 395 may be referred to as spin torque oscillators, according to some embodiments.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," United States Pub. No. 2020/0258544, filed Mar. 31, 2019, assigned to the same assignee of this application, which is herein incorporated by reference. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

It is also to be understood that aspects disclosed herein, such as the magnetic recording heads, may be used in magnetic sensor applications outside of HDD's and tape media drives such as TED's, such as spintronic devices other than HDD's and tape media drives. As an example, aspects disclosed herein may be used in magnetic elements in magnetoresistive random-access memory (MRAM) devices (e.g., magnetic tunnel junctions as part of memory elements), magnetic sensors, or other spintronic devices.

In FIG. 3A, the spintronic device 395 includes a negative polarization layer (NPL) 302 disposed on the main pole 220, an interface layer 304 disposed on the NPL 302, a first spacer layer 310 disposed on the interface layer 304, a field generating layer (FGL) 308 disposed on the first spacer layer 310, a second spacer layer 312 disposed on the FGL 308, and a notch 314 disposed on the second spacer layer 312. The notch 314 is disposed in contact with the TS 240. The TS 240 may comprise a hot seed layer (not shown) disposed adjacent to the second spacer layer 312. The NPL 302 may be referred to a spin injection layer (SIL). A first interface 332 is defined between the NPL 302 and the interface layer 304, and a second interface 334 is defined between the FGL 308 and the first spacer layer 310. The sides of the spintronic device 395 at the MFS are ion milled or patterned, for example, to form the spintronic device shape as shown. In some embodiments, a notch (not shown) in the main pole 220 can be created during the formation process of the spintronic device 395.

A current source ($I_{STO}$) 270 is configured to supply a current to the spintronic device 395. The current flowing through the spintronic device 395 flows from the TS 240 through the spintronic device 395 to main pole 220. The electron flow 318 flowing through the spintronic device 395 flows from the main pole 220 and to the TS 240. The direction of the current supplied using the current source 270 through the spintronic device 395 is opposite of the direction of the electron flow 318 through the spintronic device 395.

FIG. 3B is similar to FIG. 3A; however, FIG. 3B illustrates a reverse structure spintronic device 330. In the spintronic device 330 of FIG. 3B, the notch 314 is disposed on the main pole 220, a first spacer layer 312 is disposed on the notch 314, the FGL 308 is disposed on the first spacer layer 312, a second spacer layer 310 is disposed on the FGL 308, the interface layer 304 is disposed on the second spacer layer 310, the NPL 302 is disposed on the interface layer 304, and the TS 240 is disposed on the NPL 302. The first interface 332 is defined between the NPL 302 and the interface layer 304, and the second interface 334 is defined between the FGL 308 and the second spacer layer 310. The sides of the spintronic device 330 at the MFS are ion milled or patterned, for example, to form the spintronic device shape as shown.

A current source ($I_{STO}$) 270 is configured to supply a current to the spintronic device 330. The current flowing through the spintronic device 330 flows from the main pole 220 through the spintronic device 330 to TS 240. The electron flow 316 flowing through the spintronic device 330 flows from the TS 240 and to the main pole 220. The direction of the current supplied using the current source 270 through the spintronic device 330 is opposite of the direction of the electron flow 316 through the spintronic device 330. The direction of the current supplied to the reverse structure spintronic device 330 of FIG. 3B is opposite to the direction of the current supplied to the spintronic device 395 of FIG. 3A. Similarly, the electron flow 316 of the reverse structure spintronic device 330 of FIG. 3B is opposite to the electron flow 318 of the spintronic device 395 of FIG. 3A.

In the spintronic devices 330 and 395, the FGL 308 oscillates while the NPL 302 does not. The NPL 302 is negatively spin polarized. The FGL 308 is initially magnetized in the same direction as magnetization 320 of the main pole 220 and the TS 240, which is in a direction from the main pole 220 to the TS 240 (i.e., in the x-direction) and is in the same direction as the electron flow. The spin torque acts on the FGL 308 causing a change of angle of magnetization M of the FGL 308, precession of magnetization M, and spin flipping of the FGL 308. Precession of the magnetization M of the FGL 308 can generate an assisting magnetic field, such as an AC field, emitted to a magnetic recording medium to reduce the coercive force of the recording medium. Similarly, an assisting magnetic field, such as a DC field, enhances the write field from the main pole 220 to write to the recording medium.

The present disclosure contemplates that, depending on a polarity of the write current through a write coil (such as the coil 218 shown in FIG. 2), the magnetizations of magnetic layers (such as the main pole 220, the NPL 302, the FGL 308, and the TS 240) may be in a direction from the main pole 220 and toward the TS 240, as shown in FIG. 3A (i.e., in the x-direction), or may be in a direction from the TS 240 and toward the main pole 220, as shown in FIG. 3B (i.e., in the −x-direction).

The bias voltage (Vjump) at which spin flipping occurs is estimated according to formula (1):

$$Vjump = J_c * RA \quad (1)$$

in which $J_c$ is the critical current density for STT switching against the gap field.

In the spintronic devices 330 and 395, the NPL 302 is magnetic and includes a magnetic material, and is magnetized along the gap field direction between the main pole 220 and the TS 240. In one embodiment, which can be combined with other embodiments, the NPL 302 is magnetically stitched to the main pole 220. In one embodiment, which can be combined with other embodiments, the NPL 302 includes a plurality of electron energy bands that includes a majority spin channel and a minority spin channel. For the NPL 302, the minority spin channel includes a conductivity that is larger than a conductivity of the majority spin channel.

The NPL 302 includes one or more of Fe, Cr, N, Co, and/or Gd, such as FeCr, or an iron nitride ($Fe_xN_x$). In some embodiments, the NPL 302 comprises Fe and one or more of Ti, V, Cr, or N. For example, the NPL 302 may comprise FeTi, FeV, FeCr, or $Fe_4N$. In one embodiment, which can be combined with other embodiments, the NPL 302 includes one or more ferromagnetic materials that have a negative spin accumulation. In one embodiment, which can be combined with other embodiments, the NPL 302 includes an alloy of two materials with lattices that are oppositely aligned, such as Co and Gd in an antiparallel alignment. While shown as a single layers structure, the NPL 302 may be a multilayer structure. The NPL 302 may have a first thickness T1 within a range of about 3 nm to about 10 nm. The first thickness T1 may be varied according to a diffusion length of the NPL 302. In one example, the NPL 302 includes a spin diffusion length of about 2 nm.

In the spintronic devices 330 and 395, the interface layer 304 includes a material that has a long diffusion length, such as a diffusion length that is longer than the diffusion length of the NPL 302. The interface layer 304 comprises one of Cr, V, or Ru, or their alloys. For example, when the NPL 302 comprises one of FeTi, FeV, or FeCr, the interface layer 304 comprises one of V, Cr, or Ru. When the NPL 302 comprises $Fe_4N$, the interface layer 304 comprises Ru. While shown as a single layer structure, the interface layer 304 may be a multilayer structure.

In some embodiments, the interface layer 304 includes a material having a negative interface polarization factor ($\gamma$), such as about −0.2. The negative interface polarization factor ($\gamma$) is at the interface between the interface layer 304 and the NPL 302. The interface layer 304 includes a second thickness T2 that is within a range of about 0.2 nm to about 1.5 nm, such as about 1.0 nm. The spacer layers 310, 312 comprises Cu, NiAl, or a Ag-based material. The spacer layer 310 of FIGS. 3A-3B each have a third thickness T3 that is within a range of about 1.5 nm to about 8 nm, such as within a range of about 1.5 nm to about 2.5 nm, for example about 2.0 nm. The FGL 308 comprises CoFe, NiFe, or a CoFe-based material. The FGL 308 may have a thickness between about 5 nm to about 20 nm, such as about 10 nm.

Figure 3C:
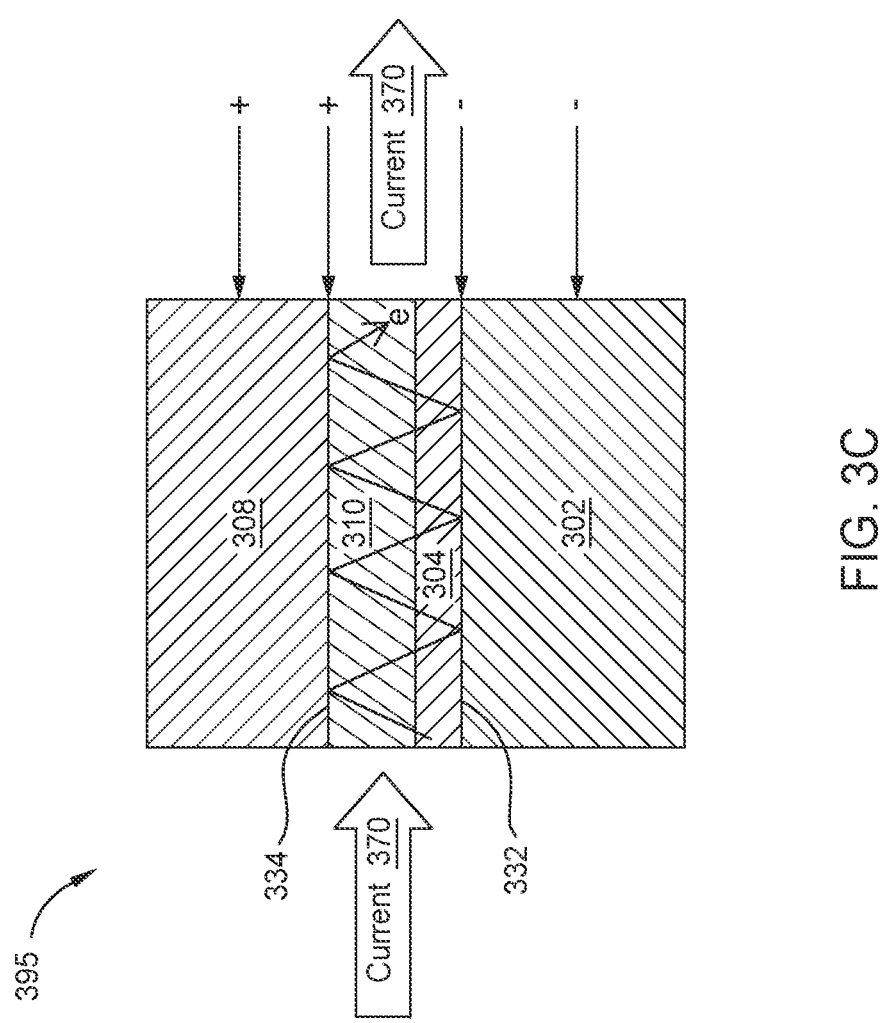
FIG. 3C is illustrates a current-in-plane (CIP) giant magnetoresistance (GMR) technique used as a means of measurement of interface spin polarization of films within the structure of spintronic device of FIG. 3A when current is applied, according to some embodiments.

FIG. 3C illustrates a current-in-plane (CIP) giant magnetoresistance (GMR) technique used as a means of measurement of interface spin polarization of films within the structure of the spintronic device 395 of FIG. 3A when current 370 is applied, according to some embodiments. For clarity, some layers of the spintronic device 395 of FIG. 3C have been removed. As shown in FIG. 3C, applying in-plane current 370 results in electrons (e) flowing through the interface layer 304 and the spacer layer 310. Further, when current 370 is applied, the NPL 302 is negatively spin polarized, a first interface 332 between the NPL 302 and the interface layer 304 is negatively spin polarized (i.e., the first interface is scattering negatively), a second interface 334 between the spacer layer 310 and the FGL 308 is positively spin polarized, and the FGL 308 is positively spin polarized. While FIG. 3C illustrates the spintronic device 395 of FIG. 3A, the first interface 332 and the second interface 334 of the spintronic device 330 of FIG. 3B are polarized in the same manner.

The first interface 332 of both the reverse structure spintronic device 330 and the spintronic device 395 being negatively spin polarized is achieved through the materials of the NPL 302 and the interface layer 304. As discussed above, when the NPL 302 comprises one of FeTi, FeV, or FeCr, the interface layer 304 comprises one of V, Cr, or Ru, resulting in the first interface 332 being negatively spin polarized. When the NPL 302 comprises $Fe_4N$, the interface layer 304 comprises Ru, resulting in the first interface 332 being negatively spin polarized. By selectively choosing which materials to use for the NPL 302 and the interface layer 304, the spin polarization of the NPL 302 and the first interface 332 can be independently controlled, and polarizations can be maximized.

Figure 4:
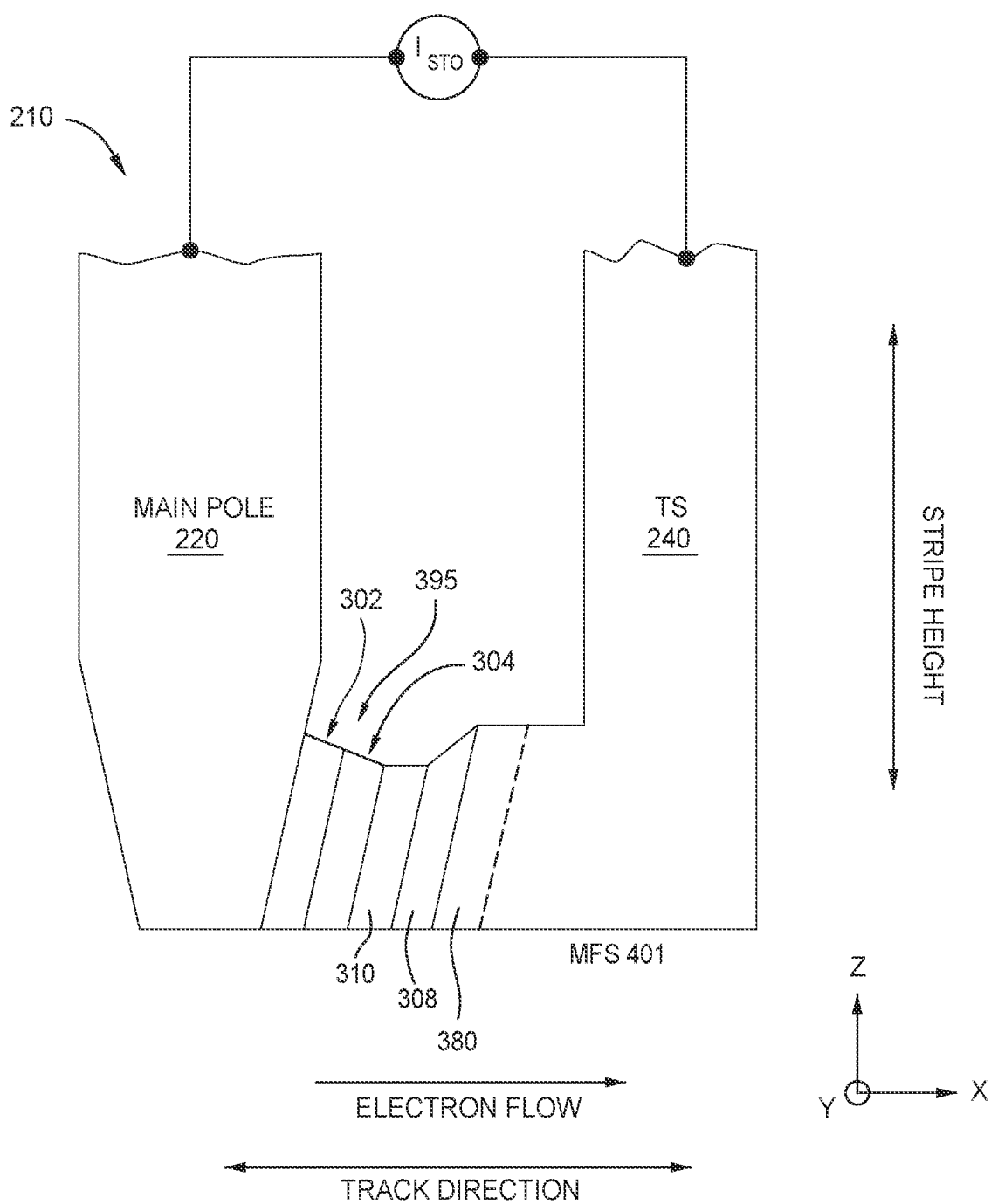
FIG. 4 is a schematic illustration of a cross-sectional throat view of the spintronic device of the write head shown in FIG. 3A, according to one implementation.

FIG. 4 is a schematic illustration of a cross-sectional throat view of the write head 210 comprising the spintronic device 395 of FIG. 3A disposed at the MFS 401, according to one implementation. While FIG. 4 shows the write head 210 comprising the spintronic device 395 of FIG. 3A, the reverse structure spintronic device 330 of FIG. 3B may be utilized in a similar manner. In FIGS. 3A-3B, the track direction is labeled as the x-coordinate and the cross-track direction is labeled as the y-coordinate. The perpendicular direction to the MFS would be the z-coordinate into/out of the X-Y plane. In FIG. 4, the track direction is labeled as the x-coordinate and the general stripe height direction is labeled in the z-coordinate. Moreover, one or more layers of the spintronic device 395, such as the second spacer layer 312, may not be shown in FIG. 4.

Each layer of the spintronic device 395, the main pole 220, and the TS 240 can have the same cross-track widths (as shown in FIG. 3A) or may have differing cross-track widths. The NPL 302, at least one of the spacer layers 310, 312, and the FGL 308 may have differing stripe heights (as shown in FIG. 4), or may have the same stripe heights. Furthermore, the NPL 302, at least one of the spacer layers 310, 312, and the FGL 308 may be tapered (as shown in FIG. 4) or non-tapered. The FGL 308 of FIG. 4 is disposed in contact with a hot seed layer 380 of the TS 240.

The FGL 308 of the spintronic devices 330, 395 of FIGS. 3A-3B and 4 may include one or more of NiFe, CoFe, CoFeNi, CoMnGe, NiCo, NiFeCu, CoFeMnGe, CoMnSi, CoFeSi, and/or other soft or hard ferromagnetic materials, other Heusler alloys, other suitable magnetic layers, and/or multiple layers thereof. The FGL 308 can include a material having magnetic anisotropy oriented in any general direction, such as perpendicular, angled, or longitudinal, to the plane of the MFS. In one embodiment, which can be combined with other embodiments, the FGL 308 includes a magnetic anisotropy, as shown in FIG. 3A.

The first and second spacer layers 310, 312 of the spintronic devices 395, 330 of FIGS. 3A-3B each include one or more non-magnetic conductive materials, such as Au, Ag, Al, Cu, AgSn, NiAl, and/or other non-magnetic conductive materials, alloys thereof, and/or multiple layers thereof. Individually, the spacer layers 310, 312 may be made of a material having a high spin transmissivity for spin torque transfer on the FGL 308.

The main pole 220 of the write head 210 shown in FIGS. 3A-3B and 4 may be any suitable shape (e.g., trapezoidal, triangular, etc.) having suitable dimensions. The write head 210 of FIGS. 3A-3B and 4 may include a leading shield positioned on one or more sides of the main pole 220 with a leading gap therebetween. The write head 210 of FIGS. 3A-3B and 4 may include a side gap positioned on the sides of the spintronic device 330, 395. The side gap may include an insulating material.

The NPL 302 and the interface layer 304 collectively facilitate operation of the FGL 308. As an example, negative spin accumulation of the NPL 302 facilitates generating direct torque on the FGL 308 to facilitate precession of the magnetization of the FGL 308 and/or to facilitate spin flipping of the FGL 308 against the field direction. The NPL 302 facilitates applying torque to the FGL 308 from both sides of the FGL 308, such as both in a direction from the TS 240 and to the FGL 308 (i.e., the −x-direction), and in a direction from the main pole 220 and to the FGL 308 (i.e., the x-direction). As an example, the negative interface polarization factor (γ) of the interface layer 304 enhances the negative spin polarization of the NPL 302.

Such aspects facilitate lower voltage or lower current (applied from a current source ($I_{STO}$)) for the spintronic device 395 or the reverse structure spintronic device 330 to facilitate reliability and effective performance of the write head 210 while facilitating high moment-thickness product and high ADC of magnetic recording for the write head 210. Such aspects also facilitate modularity for various configurations of the write head 210 and the materials that may be used for various components of the write head 210, which may further lower current density and/or voltage of the write head 210.

Aspects of the NPL 302 and the interface layer 304 collectively facilitate a reduction in critical current for flipping or switching of the FGL 308 that is up to 30% relative to a seed layer on the main pole 220, such as a reduction in critical current density $J_c$ of up to 15%-20%, due to the increase in spin-transfer torque of the FGL 308.

Figures 5A, 5B:
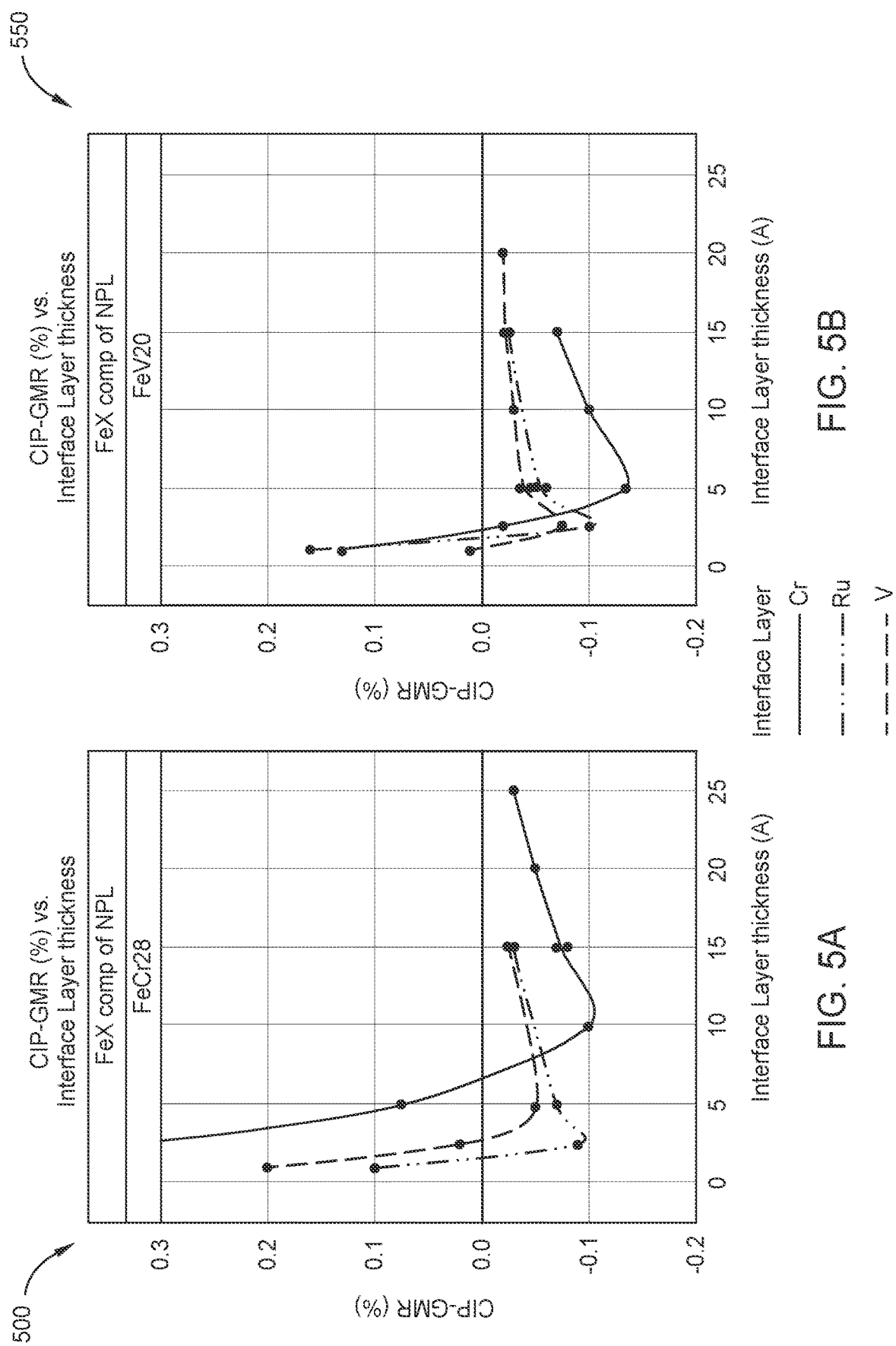
FIGS. 5A-5B are graphs illustrating current-in-plane (CIP) giant magnetoresistance (GMR) as a percentage for various materials used as the interface layer versus the thickness in angstroms of the interface layer, according to various embodiments.

FIGS. 5A-5B are graphs 500, 550 illustrating current-in-plane (CIP) giant magnetoresistance (GMR) as a percentage for various materials used as the interface layer versus the thickness in angstroms of the interface layer, according to various embodiments. As referred to in the description of FIGS. 5A-5B, the interface layer may be the interface layer 304 and the NPL may be the NPL 302 of FIGS. 3A-3C. In FIG. 5A, $FeCr_{28}$ is utilized as the NPL 302. In FIG. 5B, $FeV_{20}$ is utilized as the NPL 302. In FIGS. 5A-5B, a negative percentage CIP-GMR demonstrates the interface between the NPL 302 and the interface layer 304, such as the first interface 332 of FIG. 3C, being negatively spin polarized when current is applied (i.e., the first interface 332 is scattering negatively).

As shown in FIG. 5A, when the interface layer 304 comprises Ru, the first interface 332 is negatively spin polarized at a thickness between about 2 angstroms to about 15 angstroms when current is applied. When the interface layer 304 comprises V, the first interface 332 is negatively spin polarized at a thickness between about 3 angstroms to about 15 angstroms when current is applied. When the interface layer 304 comprises Cr, the first interface 332 is negatively spin polarized at a thickness between about 6 angstroms to about 25 angstroms when current is applied.

Similarly, as shown in FIG. 5B, when the interface layer 304 comprises Ru, the first interface 332 is negatively spin polarized at a thickness between about 1.5 angstroms to about 15 angstroms when current is applied. When the interface layer 304 comprises V, the first interface 332 is negatively spin polarized at a thickness between about 1 angstroms to about 20 angstroms when current is applied. When the interface layer 304 comprises Cr, the first interface 332 is negatively spin polarized at a thickness between about 2 angstroms to about 15 angstroms when current is applied.

Figure 6:
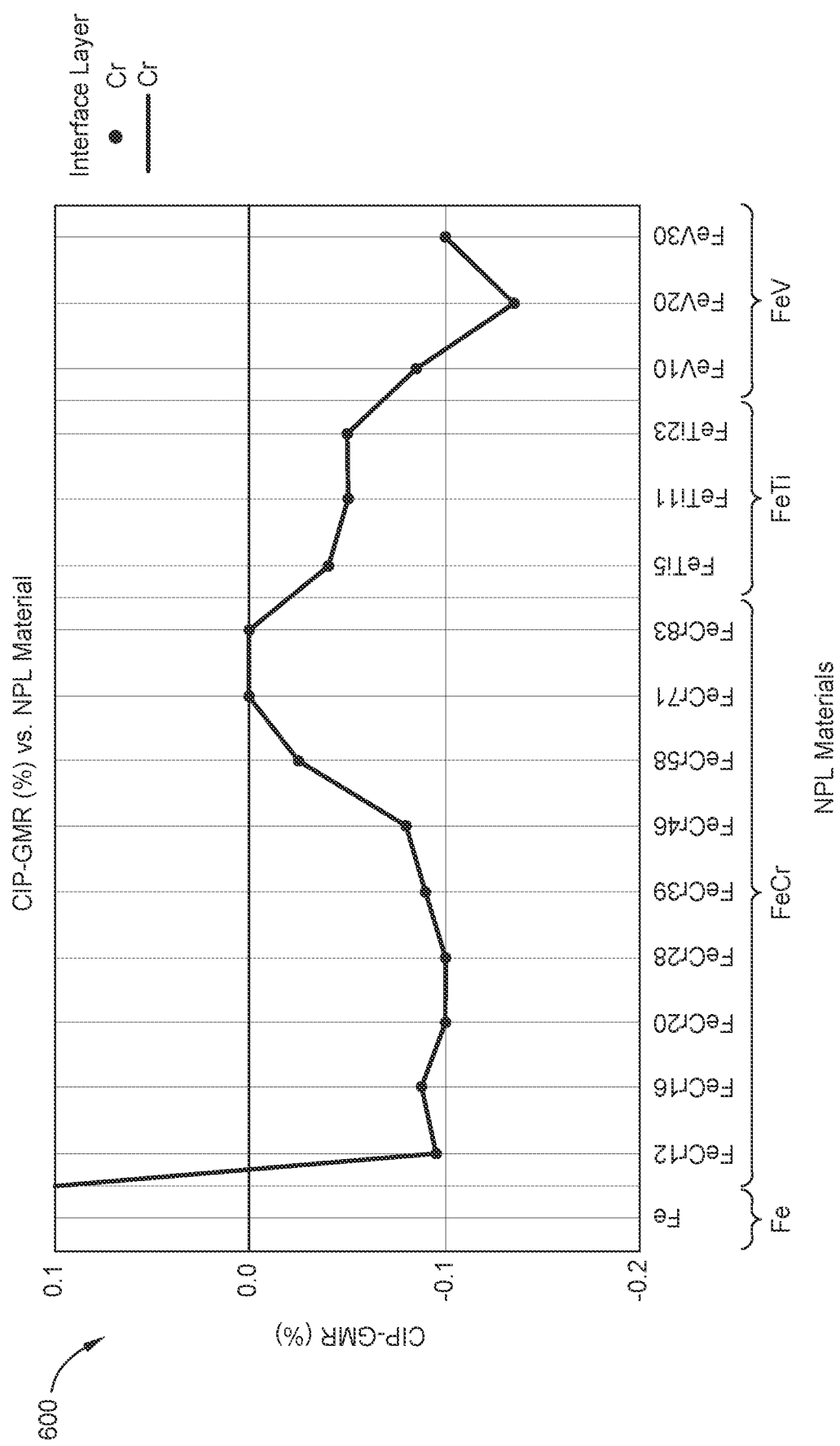
FIG. 6 is a graph illustrating CIP-GMR as a percentage for various materials used as the NPL versus the material type and composition of the NPL, according to various embodiments.

FIG. 6 is a graph 600 illustrating CIP-GMR as a percentage for various materials used as the NPL versus the material type and composition of the NPL, according to various embodiments. As referred to in the description of FIG. 6, the interface layer may be the interface layer 304 and the NPL may be the NPL 302 of FIGS. 3A-3C. In the graph 600, a negative percentage CIP-GMR demonstrates the interface between the NPL 302 and the interface layer 304, such as the first interface 332 of FIG. 3C, being negatively spin polarized when current is applied (i.e., the first interface 332 is scattering negatively).

In the example shown by the graph 600, the interface layer 304 comprises Cr and has a thickness between about 5 angstroms to about 10 angstroms. A material comprising FeX is utilized as the NPL 302, where X is one of Ti, V, or Cr, as shown on the x-axis. When the NPL 302 comprises one of $FeCr_{12}$, $FeCr_{16}$, $FeCr_{20}$, $FeCr_{28}$, $FeCr_{39}$, $FeCr_{46}$, $FeCr_{58}$, $FeTi_5$, $FeTi_{11}$, $FeTi_{23}$, $FeV_{10}$, $FeV_{20}$, or $FeV_{30}$, the first interface 332 is negatively spin polarized when current is applied. When the NPL 302 comprises a non-magnetic material such as $FeCr_{71}$, or $FeCr_{83}$, the first interface 332 is not polarized. Thus, when the interface layer 304 comprises Cr and has a thickness between about 5 angstroms to about 10 angstroms, and the NPL 302 comprises one of $FeCr_{12}$, $FeCr_{16}$, $FeCr_{20}$, $FeCr_{28}$, $FeCr_{39}$, $FeCr_{46}$, $FeCr_{58}$, $FeTi_5$, $FeTi_{11}$, $FeTi_{23}$, $FeV_{10}$, $FeV_{20}$, or $FeV_{30}$, the first interface 332 scatters negatively when current is applied.

Figure 7:
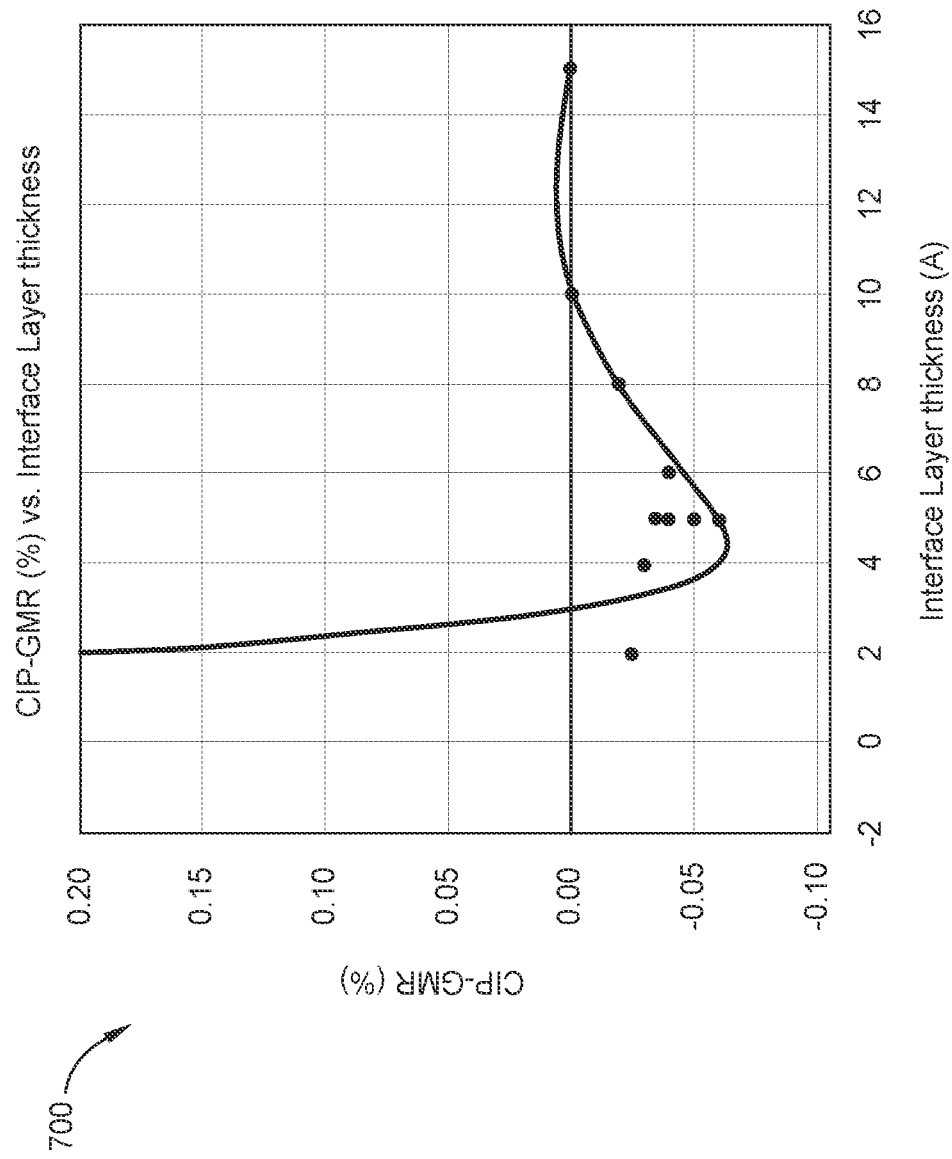
FIG. 7 is a graph illustrating CIP-GMR as a percentage versus the thickness in angstroms of the interface layer, according to various embodiments.

FIG. 7 is a graph 700 illustrating CIP-GMR as a percentage versus the thickness in angstroms of the interface layer, according to various embodiments. As referred to in the description of FIG. 7, the interface layer may be the interface layer 304 and the NPL may be the NPL 302 of FIGS. 3A-3C. In the graph 700, a negative percentage CIP-GMR demonstrates the interface between the NPL 302 and the interface layer 304, such as the first interface 332 of FIG. 3C, being negatively spin polarized when current is applied (i.e., the first interface 332 is scattering negatively). In the graph 700, $Fe_4N$ is used as the material of the NPL 302 and Ru is used as the material of the interface layer 304. When the interface layer 304 comprising Ru has a thickness of about 2 angstroms to about 10 angstroms, the first interface 332 is negatively spin polarized when current is applied.

Benefits of the present disclosure include simple and effective facilitated magnetic recording performance and reliability; increased ADC for magnetic recording; reduced voltage or current while maintaining or facilitating increased moment-thickness product, magnetic recording head performance, and reliability; modularity in magnetic recording head materials; and modularity in magnetic recording device design configurations. Furthermore, by selectively choosing which materials to use for the NPL and the interface layer, the spin polarization of the NPL and the interface disposed between the NPL and the interface layer can be independently controlled, and polarizations can be maximized.

It is contemplated that one or more aspects disclosed herein may be combined. Moreover, it is contemplated that one or more aspects disclosed herein may include some or all of the aforementioned benefits.

In one embodiment, a magnetic recording head comprises a main pole, a trailing shield, and a spintronic device disposed between the main pole and the trailing shield. The spintronic device comprises a negative polarization layer disposed on the main pole, the negative polarization layer comprising Fe and one of Ti, V, Cr, or N, an interface layer disposed on the negative polarization layer, the interface layer comprising V, Cr, or Ru, a first spacer layer disposed on the interface layer, and a field generating layer disposed on the first spacer layer.

The magnetic recording head further comprises a second spacer layer disposed on the field generating layer. The negative polarization layer comprises $FeCr_{12}$, $FeCr_{16}$, $FeCr_{20}$, $FeCr_{28}$, $FeCr_{39}$, $FeCr_{46}$, or $FeCr_{58}$. The negative polarization layer comprises $FeTi_5$, $FeTi_{11}$, or $FeTi_{23}$. The negative polarization layer comprises $FeV_{10}$, $FeV_{20}$, or $FeV_{30}$. The negative polarization layer comprises $Fe_4N$ and the interface layer comprises Ru. The negative polarization layer has a first thickness between about 3 nm to about 10 nm. The interface layer has a second thickness between about 0.2 nm to about 1.5 nm. The magnetic recording head further comprises a current source configured to apply current through the spintronic device. The negative polarization layer and a first interface disposed between the negative polarization layer and the interface layer have a negative spin polarization when current is applied. The field generating layer and a second interface disposed between the field generating layer and the first spacer layer have a positive spin polarization when current is applied.

In another embodiment, a magnetic recording head comprises a main pole, a trailing shield, and a spintronic device disposed between the main pole and the trailing shield. The spintronic device comprises a negative polarization layer disposed on the trailing shield, the negative polarization layer comprising Fe and one of Ti, V, Cr, or N, an interface layer disposed on the negative polarization layer, the interface layer comprising Cr, V, or Ru, a first interface defined between the negative polarization layer and the interface layer, a first spacer layer disposed on the interface layer, a field generating layer disposed on the first spacer layer, and a second interface defined between the first spacer layer and the field generating layer. The magnetic recording head further comprises a current source configured to apply a current through the spintronic device.

The magnetic recording head further comprises a second spacer layer disposed on the field generating layer, and a notch disposed between the second spacer layer and the main pole. The negative polarization layer and the first interface have a negative spin polarization when current is applied, and wherein the field generating layer and the second interface have a positive spin polarization when current is applied. The interface layer comprises Ru and the negative polarization layer comprises Fe and one of Ti, V, Cr, or N. The interface layer comprises Cr or V and the negative polarization layer comprises Fe and one of Ti, V, or Cr.

In another embodiment, a magnetic recording head comprises a main pole, a trailing shield, and a spintronic device disposed between the main pole and the trailing shield. The spintronic device comprises a negative polarization layer disposed on the main pole, the negative polarization layer comprising Fe and one of Ti, V, Cr, or N, an interface layer disposed on the negative polarization layer, the interface layer comprising Cr, V, or Ru, a first interface defined between the negative polarization layer and the interface layer, a first spacer layer disposed on the interface layer, a field generating layer disposed on the first spacer layer, and a second interface defined between the first spacer layer and the field generating layer. The magnetic recording head further comprises means for applying a current through the spintronic device, wherein the negative polarization layer and the first interface have a negative spin polarization and the field generating layer and the second interface have a positive spin polarization when current is applied.

The interface layer comprises Ru and the negative polarization layer comprises a material selected from the group consisting of $FeCr_{12}$, $FeCr_{16}$, $FeCr_{20}$, $FeCr_{28}$, $FeCr_{39}$, $FeCr_{46}$, $FeCr_{58}$, $FeTi_5$, $FeTi_{11}$, $FeTi_{23}$, $FeV_{10}$, $FeV_{20}$, $FeV_{30}$, and $Fe_4N$.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a main pole;
   a trailing shield; and
   a spintronic device disposed between the main pole and the trailing shield, the spintronic device comprising:
   a negative polarization layer disposed on the main pole, the negative polarization layer comprising Fe and one of Ti, V, Cr, or N;
   an interface layer disposed on the negative polarization layer, the interface layer comprising V, Cr, or Ru;
   a first spacer layer disposed on and in contact with the interface layer; and
   a field generating layer disposed on the first spacer layer.

2. The magnetic recording head of claim 1, further comprising a second spacer layer disposed on the field generating layer.

3. The magnetic recording head of claim 1, wherein the negative polarization layer comprises $FeCr_{12}$, $FeCr_{16}$, $FeCr_{20}$, $FeCr_{28}$, $FeCr_{39}$, $FeCr_{46}$, or $FeCr_{58}$.

4. The magnetic recording head of claim 1, wherein the negative polarization layer comprises $FeV_{10}$, $FeV_{20}$, or $FeV_{30}$.

5. The magnetic recording head of claim 1, wherein the negative polarization layer has a first thickness between about 3 nm to about 10 nm, and wherein the interface layer has a second thickness between about 0.2 nm to about 1.5 nm.

6. The magnetic recording head of claim 1, further comprising a current source configured to apply current through the spintronic device.

7. The magnetic recording head of claim 6, wherein the negative polarization layer and a first interface disposed between the negative polarization layer and the interface layer have a negative spin polarization when current is applied.

8. The magnetic recording head of claim 6, wherein the field generating layer and a second interface disposed between the field generating layer and the first spacer layer have a positive spin polarization when current is applied.

9. A magnetic recording device comprising the magnetic recording head of claim 1.

10. A magnetic recording head, comprising:
    a main pole;
    a trailing shield; and
    a spintronic device disposed between the main pole and the trailing shield, the spintronic device comprising:
    a negative polarization layer disposed on the main pole, the negative polarization layer comprising Fe and one of Ti, V, Cr, or N;
    an interface layer disposed on the negative polarization layer, the interface layer comprising V, Cr, or Ru;
    a first spacer layer disposed on the interface layer; and
    a field generating layer disposed on the first spacer layer, wherein the negative polarization layer comprises $FeTi_5$, $FeTi_{11}$, or $FeTi_{23}$.

11. A magnetic recording head, comprising:
    a main pole;
    a trailing shield; and
    a spintronic device disposed between the main pole and the trailing shield, the spintronic device comprising:
    a negative polarization layer disposed on the main pole, the negative polarization layer comprising Fe and one of Ti, V, Cr, or N;
    an interface layer disposed on the negative polarization layer, the interface layer comprising V, Cr, or Ru;
    a first spacer layer disposed on the interface layer; and
    a field generating layer disposed on the first spacer layer, wherein the negative polarization layer comprises $Fe_4N$ and the interface layer comprises Ru.

12. A magnetic recording head, comprising:
    a main pole;
    a trailing shield;
    a spintronic device disposed between the main pole and the trailing shield, the spintronic device comprising:
    a negative polarization layer disposed on the trailing shield, the negative polarization layer comprising Fe and one of Ti, V, Cr, or N;
    an interface layer disposed on the negative polarization layer, the interface layer comprising Cr, V, or Ru;
    a first interface defined between the negative polarization layer and the interface layer;
    a first spacer layer disposed on the interface layer;
    a field generating layer disposed on the first spacer layer;
    a second spacer layer disposed on the field generating layer; and
    a notch disposed between the second spacer layer and the main pole; and
    a second interface defined between the first spacer layer and the field generating layer; and
    a current source configured to apply a current through the spintronic device.

13. The magnetic recording head of claim 12, wherein the negative polarization layer and the first interface have a negative spin polarization when current is applied, and wherein the field generating layer and the second interface have a positive spin polarization when current is applied.

14. The magnetic recording head of claim 12, wherein the interface layer comprises Ru and the negative polarization layer comprises Fe and one of Ti, V, Cr, or N.

15. The magnetic recording head of claim 12, wherein the interface layer comprises Cr or V and the negative polarization layer comprises Fe and one of Ti, V, or Cr.

16. A magnetic recording device comprising the magnetic recording head of claim 12.

17. A magnetic recording head, comprising:
a main pole;
a trailing shield;
a spintronic device disposed between the main pole and the trailing shield, the spintronic device comprising:
  a negative polarization layer disposed on the main pole, the negative polarization layer comprising Fe and one of Ti, V, Cr, or N;
  an interface layer disposed on the negative polarization layer, the interface layer comprising V, Cr, or Ru;
  a first interface defined between the negative polarization layer and the interface layer;
  a first spacer layer disposed on and in contact with the interface layer;
  a field generating layer disposed on the first spacer layer; and
  a second interface defined between the first spacer layer and the field generating layer; and
means for applying a current through the spintronic device, wherein the negative polarization layer and the first interface have a negative spin polarization and the field generating layer and the second interface have a positive spin polarization when current is applied.

18. The magnetic recording head of claim 17, wherein the interface layer comprises Ru and the negative polarization layer comprises a material selected from the group consisting of $FeCr_{12}$, $FeCr_{16}$, $FeCr_{20}$, $FeCr_{28}$, $FeCr_{39}$, $FeCr_{46}$, $FeCr_{58}$, $FeTi_5$, $FeTi_{11}$, $FeTi_{23}$, $FeV_{10}$, $FeV_{20}$, $FeV_{30}$, and $Fe_4N$.

19. A magnetic recording device comprising the magnetic recording head of claim 17.

20. The magnetic recording head of claim 17, wherein the field generating later is disposed on and in contact with the first spacer layer.

* * * * *